United States Patent [19]

Klaus

[11] 3,734,485

[45] May 22, 1973

[54] HOLD-DOWN DEVICE FOR SHEARS IN PARTICULARL FOR BAR STOCK SHEARS

[75] Inventor: Siegfried Klaus, Ennepetal, Germany

[73] Assignee: Paul Ferd Peddinghaus, Gevelsberg, Germany

[22] Filed: May 11, 1971

[21] Appl. No.: 142,274

[30] Foreign Application Priority Data

May 14, 1970 Germany.....................P 20 23 517.0

[52] U.S. Cl. .....................269/137, 83/452, 83/459, 83/463
[51] Int. Cl. ............................B23q 3/02, B26d 7/02
[58] Field of Search.....................269/137, 138, 134, 269/136; 83/452, 459, 451, 453, 458, 460, 463, 454, 456

[56] References Cited
UNITED STATES PATENTS

| 3,595,112 | 7/1971 | DeGeorge | 269/137 X |
| 1,372,459 | 3/1921 | Schwarz | 269/134 |
| 2,605,795 | 8/1952 | Tracy | 269/137 X |
| 98,611 | 1/1870 | Montague | 83/452 X |

*Primary Examiner*—Andrew R. Juhasz
*Assistant Examiner*—James F. Coan
*Attorney*—Walter Becker

[57] ABSTRACT

A device for holding work pieces to be cut on supporting means of shears, which includes a holding member guided so as to be continuously inclined toward said supporting means and to be movable simultaneously along the inclination of said holding member and toward a work piece supporting horizontal surface of said supporting means while eccentric means periodically withdraw said holding means from said supporting means.

6 Claims, 2 Drawing Figures

PATENTED MAY 22 1973 3,734,485

INVENTOR
Siegfried Klaus
By Walter Becker

HOLD-DOWN DEVICE FOR SHEARS IN PARTICULARL FOR BAR STOCK SHEARS

The present invention relates to a holding device for holding down shears, especially bar steel shears, with a drive for opening the holding down mechanism.

Bar steel shears are known which are are designated as alligator shears and in which the holding down beam is moved upwardly and downwardly by a drive. According to another embodiment of such shears, the holding down beam is pivotally mounted on the shear frame and has a ratchet safety locking mechanism. The ratchet tooth which is to be loosened by means of a linkage or a bowden wire maintains the holding down beam in its working position.

Furthermore, holding down mechanisms have become known for profile bar shears with cutting slots for profile steels which cutting slots are at a right angle with regard to each other and are used in particular for L-profiles with uneven legs. According to this type of holding down mechanism, the holding down beam is adjustable in the direction toward the profile and, more specifically, at an angle of approximately 45° to the cutting slots.

With all heretofore known holding down mechanisms, mechanical, hydraulic or pneumatic means are provided which move the holding down beam toward the material to be cut and hold the beam in its position on the material to be cut during the cutting operation. In other words, the beam is blocked until the cutting operation is completed whereupon the holding down beam is returned to its starting position.

It is an object of the present invention to provide an improved holding down mechanism for shears, especially for bar steel shears, with a drive for effecting the opening movement of the holding down beam.

It is another object of this invention to provide an inexpensive and simple holding down mechanism for bar steel shears which are relatively small and in most instances movable with regard to billet and profile bar shears, and to provide such holding down mechanism with a drive serving only for the return of the holding mechanism to its starting position.

These and other objects and advantages of the invention will appear more clearly from the following specification in connection with the accompanying drawing, in which.

Figure 1:
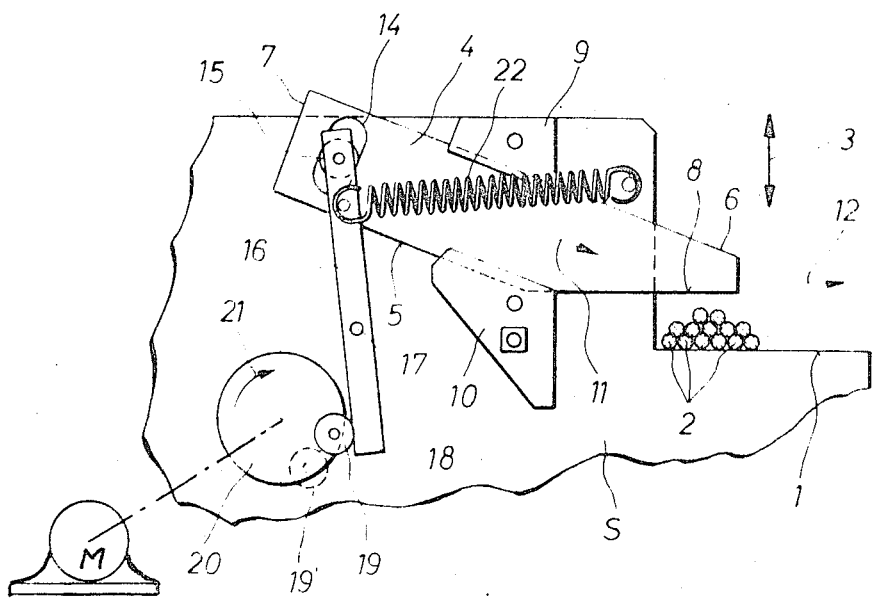
FIG. 1 illustrates a side view of a holding down mechanism according to the present invention in open position.

The holding down mechanism for shears, especially bar steel shears, according to the invention with a drive for opening the holding down mechanism is characterized primarily in that the holding down member is a beam of trapezoidal configuration which is guided by suitable guiding means. Preferably, the holding down beam is guided at an inclination of less than 45° with regard to the horizontal plane.

According to one practical embodiment of the invention, the holding down beam is guided by two vertically arranged superimposed plates or the like which are located laterally of the mouth of the shears and have inclined guiding surfaces on two sides located opposite to each other.

The invention is based on the idea to move the holding down beam along a plane inclined toward the shearing direction in such a way that the steel bars of a bundle will laterally be distributed on the support therefor when the holding down beam moves downwardly so that the originally bundled steel bars will then be located in a plane one adjacent to the other. The further feature underlying the present invention consists in that no return safety mechanism for the holding down beam is required inasmuch as the return movement is directed perpendicularly with regard to the horizontal plane whereas the holding down beam is held in inclined guiding means and in its working position is clamped fast in its guiding means during the shearing operation while the counter pressure is directed upwardly.

According to a still further feature of the invention, the holding down beam moves, due to its own weight and/or under the influence of a spring, into its working position from which, in conformity with still another feature of the present invention, the holding down beam is by means of an eccentric and a two-arm lever moved into its starting position.

Referring now to the drawing in detail, the shears S has in a manner known per se a support 1 for supporting a bundle of bar steels 2 prior to the cutting operation. The non-illustrated shearing blade moves in the direction of the arrow 3 back and forth and cuts the bar steels on the support 1.

Figure 2:
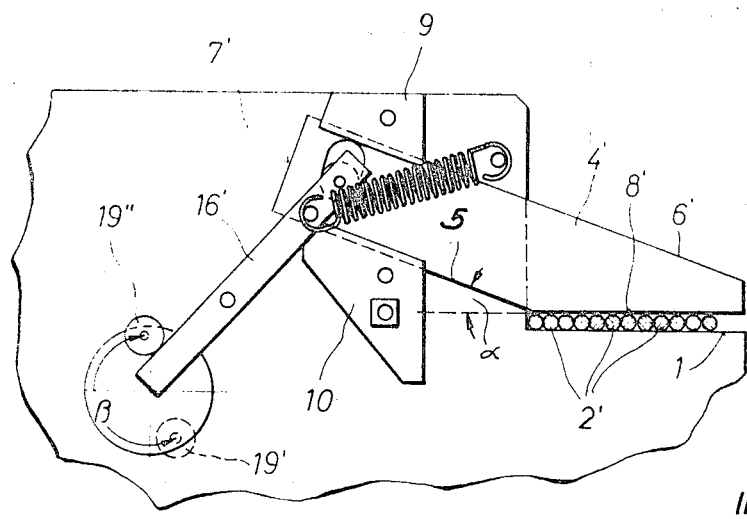
FIG. 2 shows the holding mechanism of FIG. 1 in closed position.

In order to move the bundled steel bars into a position in which they are located one behind the other as shown in FIG. 2, and furthermore in order to maintain the steel bars during the cutting operation in this position, a holding down beam 4 is provided which comprises two parallel sides 5, 6, one end side 7 and a fourth side 8. The beam 4 thus forms a trapezoid with the two parallel sides 5, 6. On its sides 5, 6 the beam 4 is guided by two plates 9, 10 with regard to the horizontal plane at an angle $\alpha$ which is less than 45°. During this guiding operation, the beam 4 moves in the direction of the arrow 11 to its position 4' shown in FIG. 2 and from this position is returned to its starting position shown in FIG. 1. The sides 5–8 of the beam 4 will in the operative position of the holding down beam occupy the positions 5', 6', 7' and 8'. In other words, the side 8 retains its horizontal position but carries out a lateral displacement. In view of this movement in the direction of the arrow 12, the steel bars 2 of the bundle are laterally distributed so that the bar steels will occupy the position shown in FIG. 2. in which they are located one adjacent to the other.

During the cutting operation, the holding down beam 4 is retained in its position 4' as shown in FIG. 2 inasmuch as the cutting counter pressure is effective in the direction of the arrow 13 and thus no displacement of the beam 4 from its position 4' will occur inasmuch as the angle of inclination $\alpha$ of the holding down beam is selected as less than 45°.

At that section of the holding down beam 4 which is adjacent to the end side 7 there is provided an oblong hole 14 into which extends a roller 15 of a two-arm lever 16. Lever 16 is pivotally journalled at 17. The end 18 of lever 16 cooperates with a roller 19 of an eccentric wheel 20 which is rotatable in the direction of the arrow 21. When the roller 19 moves out of its position shown in solid lines in FIG. 1 in clockwise direction to the position shown in dash lines in FIG. 1, the roller 19 frees the lever 16 so that the holding down beam 4 now moves from its position 4 to its position 4'. After the roller 19 has moved through an angle β which equals or exceeds 180° and has reached its position 19" shown in dash lines, roller 19 again engages the lever 16 which up to that time occupied the position 16", and moves said lever 16 as well as the beam 4 to their starting position. In conformity with the speed of rotation of wheel 20, thus the duration of the opening and working positions of the holding down beam can be determined. A spring 22 may engage either that section of the holding down beam 4 which is adjacent to the end side 7 or may engage the lever 16. The holding down beam 4 is brought from its starting position shown in FIG. 1 to its position shown in FIG. 2 by means of its own weight aided by the spring 22.

It is, of course, to be understood that the present invention is, by no means, limited to the particular showing in the drawing but also comprises any modifications within the scope of the appended claims.

What I claim is:

1. In combination with shears, especially bar steel shears, having supporting means with a substantially horizontal supporting surface for receiving and supporting bars to be cut, a holding device for holding the bars to be cut down onto said supporting means during the cutting operation of said shears, said holding device including: guiding means connected to said shears and having guiding surfaces inclined toward and relative to said substantially horizontal supporting surface, holding means having two parallel surfaces arranged oppositely with regard to each other and reciprocably guided by said guiding surfaces of said guiding means, said holding means also having a surface substantially parallel to said supporting surface and being movable simultaneously toward and parallel to said supporting surface in response to said holding means being movably guided in said guiding means in the direction toward said supporting means, said guiding means keeping said holding means inclined toward said supporting means in such a way that said holding means has the tendency by its own weight to move toward said supporting means, said holding means being movable simultaneously parallel to and away from said supporting surface in response to said holding means being moved in said guiding means away from said supporting means, and means for moving said holding means in said guiding means in the direction toward and away from said supporting means.

2. An arrangement according to claim 1, in which said holding means is inclined toward said horizontal supporting surface by an angle of less than 45°.

3. An arrangement according to claim 1, which includes spring means for continuously urging said holding means to move toward said supporting means.

4. An arrangement according to claim 1, in which said guiding means include two vertically spaced plates comprising said guiding surfaces and arranged on opposite sides of said holding means.

5. An arrangement according to claim 1, which includes two-arm lever means pivotally supported by said shears and in movable engagement with said holding means, eccentric means operable to actuate said two-arm lever means for moving said holding means away from said supporting means, and motor means for actuating said eccentric means.

6. An arrangement according to claim 5, in which said eccentric means is so designed as to periodically release said two-arm lever means to thereby permit said holding means to move toward said supporting means for holding work pieces thereon to be cut.

* * * * *